US006558533B2

(12) United States Patent
Schmidt et al.

(10) Patent No.: US 6,558,533 B2
(45) Date of Patent: May 6, 2003

(54) PROCESS FOR SULFUR REMOVAL FROM HYDROCARBON LIQUIDS

(75) Inventors: Stephen Raymond Schmidt, Silver Spring, MD (US); Richard Franklin Wormsbecher, Dayton, MD (US); Robert Hibbard Harding, Mainz (DE)

(73) Assignee: W.R. Grace & Co.-Conn, Columbia, MD (US)

( * ) Notice: Subject to any disclaimer, the term of this patent is extended or adjusted under 35 U.S.C. 154(b) by 0 days.

(21) Appl. No.: 09/833,602

(22) Filed: Apr. 13, 2001

(65) Prior Publication Data

US 2003/0019794 A1 Jan. 30, 2003

(51) Int. Cl.⁷ .......................... C10G 29/00; B01J 20/34; B01J 38/68
(52) U.S. Cl. .................... 208/244; 208/208 R; 585/274; 585/276; 585/900; 585/904; 502/25; 502/28; 502/33; 502/517
(58) Field of Search ............................. 502/25, 28, 33, 502/517; 585/274, 276, 900, 904; 208/244, 208 R

(56) References Cited

U.S. PATENT DOCUMENTS

| 1,628,190 A | 5/1927 | Raney | |
| 1,915,473 A | 6/1933 | Raney | |
| 2,139,602 A | 12/1938 | Raney | 23/238 |
| 2,461,396 A | 2/1949 | Raney | 75/0.5 |
| 2,977,327 A | 3/1961 | Raney | 252/472 |
| 3,351,495 A | 11/1967 | Larsen et al. | 136/146 |
| 3,674,707 A * | 7/1972 | Pieters et al. | 502/25 |
| 3,904,551 A | 9/1975 | Lundsager et al. | 252/455 R |
| 3,907,710 A | 9/1975 | Lundsager et al. | 252/455 R |
| 4,188,285 A | 2/1980 | Michlmayr | 208/246 |
| 4,510,263 A | 4/1985 | Pereira et al. | 502/314 |
| 4,790,982 A | 12/1988 | Yoo et al. | 423/239 |
| 4,826,799 A | 5/1989 | Cheng et al. | 502/301 |
| 4,895,994 A | 1/1990 | Cheng et al. | 585/270 |
| 4,957,718 A | 9/1990 | Yoo et al. | 423/244 |
| 4,957,892 A | 9/1990 | Yoo et al. | 502/63 |
| 4,963,520 A | 10/1990 | Yoo et al. | 502/64 |
| 5,376,608 A | 12/1994 | Wormsbecher et al. | 502/61 |
| 5,516,334 A | 5/1996 | Easton | 482/8 |
| 5,525,210 A | 6/1996 | Wormsbecher et al. | 208/122 |
| 5,674,796 A * | 10/1997 | Lee et al. | 502/22 |

FOREIGN PATENT DOCUMENTS

| EP | 0275855 | 11/1990 | C07C/15/04 |

OTHER PUBLICATIONS

"Regeneration of a nickel/silica catalyst poisoned by thiopene" Applied Catalysis A: General, 90 (1992) 131–144.
"The Poisoning of Metallic Catalysts", Adv. Catalysis, vol. 2, pp. 129–178 (1951).

* cited by examiner

Primary Examiner—Walter D. Griffin
Assistant Examiner—Tam M. Nguyen
(74) Attorney, Agent, or Firm—H. Troffkin

(57) ABSTRACT

The present invention is directed to a method of desulfurization of a sulfur laden hydrocarbon liquids that comprises contacting the liquid with a sponge nickel metal alloy, removing the sulfur free liquid, regeneration of the alloy by contact with an aqueous solution of an oxidant and reusing the alloy for further desulfurization of additional sulfur laden liquid.

30 Claims, No Drawings

PROCESS FOR SULFUR REMOVAL FROM HYDROCARBON LIQUIDS

FIELD OF THE INVENTION

The present invention is directed to an improved process capable of providing product streams of light and heavy gasoline fractions, which are substantially free of sulfur containing compounds.

BACKGROUND OF THE INVENTION

Catalytic cracking is a petroleum refining process, which is applied commercially on a very large scale. A majority of the refinery gasoline blending pool in the United States is produced using a fluidized catalytic cracking (FCC) process. In the process, heavy hydrocarbon feedstocks are converted into lighter products by reactions taking place at elevated temperatures in the presence of a catalyst, with the majority taking place in the vapor phase. The feedstock is thereby converted into gasoline, distillates and other liquid fraction product streams as well as lighter gaseous cracking products having four or less carbon atoms per molecule. The three characteristic steps of a catalytic cracking process comprises: a cracking step in which the heavy hydrocarbon feed stream is converted into lighter products, a stripping step to remove adsorbed hydrocarbons from the catalyst material, and a regeneration step to burn off coke formations from the catalyst material which is then recirculated and reused in the cracking step.

Petroleum feedstocks normally contain organic sulfur compounds, such as mercaptans, sulfides and thiophenes. The products of the cracking process correspondingly tend to contain sulfur impurities even though about half of the sulfur compounds are converted to hydrogen sulfide during the cracking process, mainly by catalytic decomposition of non-thiophenic sulfur compounds. The thiophenic and other organic sulfur containing compounds have been found most difficult to remove. The specific distribution of sulfur in the cracking products is dependent on a number of factors including feed, catalyst type, additives present, conversion and other operating conditions, but, in any event in a certain proportion of the sulfur tends to enter the light or heavy gasoline fractions and passes over into the product pool. Although petroleum feedstock normally contains a variety of sulfur born contaminants, one of the chief concerns is the presence of unsubstituted and hydrocarbyl substituted thiophenes and its derivatives, such as thiophene, methylthiophene, ethylthiophene, propylthiophene, benzothiophene, and tetrahydrothiophene, as well as thiophenols, in the heavy and light gasoline fraction product streams of the refining process (e.g. fluid cracking catalyst process). These compounds generally have boiling points within the range of the light and heavy gasoline fractions and, thus, become concentrated in these product streams.

In response to concerns about emission of sulfur oxides and other sulfur compounds into the atmosphere following combustion, various governmental agencies have promulgated regulations on the amount of sulfur contained in these petroleum-refining products. For example, the U.S. Government has issued Reformulated Gasoline (RFG) regulations, as well as Amendments to the Clean Air Act. In addition, the California Air Resources Board has set a limit on the concentration of sulfur in gasoline to about 40 parts per million (ppm). Since the current sulfur levels in gasoline are about 385 ppm, these new lower goals require significant resources by most petroleum refiners to meet the new level.

Several approaches have been developed to remove sulfur from gasoline. One approach has been the removal of sulfur containing compounds from feedstock by hydrotreating the stock prior to cracking. While highly effective, this approach tends to be expensive in terms of capital costs of the equipment required as well as operationally, since large amounts of hydrogen are consumed.

From the economic point of view, it would be desirable to achieve thiophenic sulfur removal in the cracking process itself since this would effectively desulfurize the major components of the gasoline blending pool without additional treatment. Various catalytic materials have been developed for the removal of sulfur during the FCC process cycle. For example, a FCC catalyst impregnated with vanadium and nickel metal has been shown to reduce the level of product sulfur. See Myrstad et al., Effect of Nickel and Vanadium on Sulfur Reduction of FCC Naptha, Applied Catalyst A: General 192 (2000) pages 299–305. This reference also showed that a sulfur reduction additive based on a zinc-impregnated alumina is effective to reduce product sulfur in FCC products. However, when these materials are mixed with metal impregnated FCC catalyst, the effect of sulfur reduction was lessened and became economically inefficient.

Other developments for reducing product sulfur have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed. See Krishna et al., Additives Improved FCC Process, Hydrocarbon Processing, November 1991, pages 59–66. Although sulfur is removed from the stack gases of the regenerator, product sulfur levels are not greatly effected, if at all.

An alternative technology for the removal of sulfur oxides from regenerator stack gases is based on the use of magnesium-aluminum spinels as additives to the circulating catalyst inventory in the FCC unit. Exemplary patents disclosing this type of sulfur removal additives include U.S. Pat. Nos. 4,963,520; 4,957,892; 4,957,718; 4,790,982 and others. Again, however, product sulfur levels are not greatly reduced.

A catalyst composition to reduce sulfur levels in liquid cracking products has been described in Wormsbecher and Kim in U.S. Pat. Nos. 5,376,608 and 5,525,210. The composition proposes the addition of a cracking catalyst additive, composed of an alumina-supported Lewis acid, with conventional zeolite molecular sieves. Although this system has the advantages of causing sulfur reduction in the cracking process, the composition has not achieved significant commercial success. It has been found that the compositions proposed by Wormsbecher et al. do not provide significant reduction of the levels of thiophenes and its derivatives, even when high levels of the alumina-supported Lewis acid additives are included in the composition. The use of greater than about 10 weight percent of additives in their composition does not provide a benefit equal to the cost of the additive.

The possibility of adsorbing thiophenes directly from gasoline has been explored briefly in the scientific literature. A. B. Salem in *Ind. Eng. Chem. Res.*, 33, page 336 (1964) and Garcia et al. in *J. Phys. Chem.* 96 page 2669 (1991) have shown that certain zeolite materials can be used to adsorb thiophenes from olefin-free gasoline. Exchanged zeolites, such as Ag-exchanged Zeolite Y and Cu-exchanged Zeolite Y have been shown to adsorb sulfur from standard gasoline (See U.S. Pat. No. 4,188,285 and EP 0,275,855). However, in each case, the absorption capacity of the adsorbent material is insufficient for commercial application.

It is also recognized that raw fuels, such as gasoline, diesel fuels and the like may not be useful as a fuel source for a fuel cell power plant due to the presents of organo-sulfur compounds in the fuel source. Hydrogen generation in the presence of sulfur and sulfur compounds results in a poisoning effect on all of the catalysts used in a hydrogenation generating system, including fuel cell anode catalysts. Conventional fuel processing systems used with fuel cell power plants include a thermal steam reformer, such as that described in U.S. Pat. No. 5,5 16,334. In such a system, the sulfur is removed from the fuel by conventional hydrodesulfurization techniques. The resultant hydrogen sulfide is then removed using a zinc oxide bed. While this system is satisfactory when used in combination with large stationary applications, it does not lend itself to mobile transportation applications because of the systems size cost and complexity. It would be highly desired to have a cost-effective means of removing sulfur from hydrocarbon fuels so that they can be used in fuel cell applications.

It would be desirable to have an economical and effective process, which is capable of removing sulfur-containing materials, such as thiophenes, directly from gasoline product streams obtained from cracking processes.

It would also be desirable to have an economical and effective process which selectively adsorbs sulfur containing materials contained in a gasoline product stream and in which the absorbent can be readily desorbed of the sulfur material and recycled to further remove sulfur material from additional gasoline product.

SUMMARY OF THE INVENTION

The present invention is directed to the desulfurization of hydrocarbon compositions by contacting sulfur laden hydrocarbon liquid such as product stream liquid of petroleum refining processes with Raney® nickel catalyst compositions useful in packed bed reactors, and separating the desulfurized hydrocarbon liquid from the Raney nickel material. The process further provides for removal of the sulfur species from the Raney nickel and reusing the regenerated catalyst to treat additional sulfur-laden hydrocarbon liquid.

DETAILED DESCRIPTION OF THE INVENTION

The present process provides an effective and economic method of removing sulfur species from hydrocarbon liquids, especially light and heavy gasoline fractions obtained from cracking of petroleum heavy hydrocarbon feed. The present process comprises contacting sulfur-ladened hydrocarbon liquid product with porous nickel-alumina or nickel-aluminum fixed bed catalyst material that is contained in a fixed bed reactor and recovering the resultant desulfurized hydrocarbon liquid. The sulfur species of sulfur-laden fixed bed catalyst can be readily removed by the present invention to provide a regenerated porous catalyst. This catalyst can again be utilized for removal of sulfur species from additional hydrocarbon liquid. Thus, the present invention provides a process that can effectively and economically produce a sulfur free hydrocarbon product.

The terms "fixed bed reactor" or "packed bed reactor" as used herein and in the claims appended hereto interchangeably refer to any reactor in which the catalyst is in a densely loaded or substantially stationary form. For example, the reactor may have a packed column or an ebullating bed form. The terms "fixed bed catalyst" or "packed bed catalyst" interchangeably refer to catalyst compositions useful in these reactors.

The process and system of the present invention is particularly adapted for the treatment of hydrocarbon product streams from catalytic cracking processes. It should be understood, however, that the scope of the present invention is not limited to hydrocarbon liquids obtained from such processes.

The process and system of the present invention is also useful in the treatment of hydrocarbon product streams contemplated for use in fuel cell applications.

Catalytic cracking is a petroleum refining process whereby heavy hydrocarbon feed is converted into lighter products by reactions, which take place at elevated temperatures in the presence of a catalyst. The majority of the conversions occur in the vapor phase. The feedstock is converted into gasoline, distillate and other liquid products as well as lighter gaseous products having one to four carbon atoms per molecule. This petroleum refining process is normally perceived as being composed of three steps comprising the cracking step in which the petroleum hydrocarbons are converted into lighter, commercially desirable distillate products, a stripping step to remove hydrocarbon adsorbed on the catalyst and a regeneration step to burn off coke which has accumulated on the catalyst during cracking.

Distillate products suitable for processing according to the present invention are typically are light products composed of hydrocarbon components in which about 10 percent by volume having boiling points in the range of from about 80° to 180° F. (27°–83° C.) and the remaining having boiling points within the range of from about 180° to 500° F. (83° to 260° C. Suitable distillate products may also be light cycle oil and/or gasoline products having about 10 percent by volume having boiling points of from about 300° F. (149° C.) to 500° F. (260° C.) with the remaining 90 percent by volume having boiling points in the range of from about 500° F. (260° C.) to not more than about 750° F. (399° C.).

Typical distillates, which can be subjected to the desulfurization process of the present invention described below, may have the following characteristics:

|  | Lt. Cycle Oils | Gasolines |
|---|---|---|
| Density A.P.I | 16–30 | 40–70 |
| H/C atomic ratio | 1.4–1.9 |  |
| Nitrogen, wt. % | 0.01–0.1 |  |
| Sulfur, wt. % | 0.2–1.2 | 0.05–1.2 |
| Aromatics | 35–40 | 15–30 |
| Olefinic | 1–4 | 20–35 |
| Saturated | Balance | Balance |
| Distillation Initial B.P. | 310–430° F. (154–221° C.) | 80° F. (27° C.) |
| 10% | 390–495° F. (199–257° C.) | 90°–210° F. (32°–99° C.) |
| 50% | 510–575° F. (266–302° C.) | 250°–300° F. (121°–149° C.) |
| 90% | 625–690° F. (329–366° C.) | 350°400° F. (176°–205° C.) |
| End Point | 700–780° F. (371–416° C.) | 400°–450° F. (205°–232° C.) |

The distillate hydrocarbon mixture normally contains sulfur species that need to be removed to provide a resultant product having a reduced sulfur content which causes the product to be environmentally acceptable. The product stream may be a product of a hydrotreating processes (hydrogenalysis and treated product) or from absorption processes (treating).

The terms "sulfur" and "sulfur species" as used herein and in the appended claims refer to elemental sulfur and to organic sulfur compounds including sulfides, such as a di C3–C6 sulfide, as for example propyl sulfide, butyl sulfide pentyl sulfide, hexyl sulfide and the like; disulfides, such as di C2–C4 disulfides, as for example ethyl disulfide, propyl disulficle, butyl disulfide and the like; mercaptans, such as C1–C4 alkanethiols as, for example, mathanethiol, ethanethiol, propanethiol and the like; thiophenes, such as methylthiophene, ethylthiophene, propylthiophene, dihydrothiophene and the like; benzothiophenes, such as a C1–C4 alkyl benzothiophene as, for example, methyl benzothiophene, dimethylbenzothiophene and the like; dibenzothiophenes; mixtures of said organic sulfur compounds, and the like which are contained in a liquid hydrocarbon.

The present invention is directed to contacting sulfur laden hydrocarbon distillate with a sponge nickel metal alloy catalyst (also referred to herein as a "Raney nickel catalyst"). The distillate and Raney nickel may be contacted by passing the distillate through a packed bed (e.g. fixed bed or ebullated bed) of the present catalyst. The materials are contacted under ambient pressure, which normally is from atmospheric pressure to a slightly elevated pressure (e.g., up to about 5 atmospheres). The materials are contacted at temperatures ranging from 15 to 150° C., such as 15° C. to 70° C., "Raney Ni", as used herein and in the appended claims, refers to a porous catalytic alloy based material of nickel and aluminum that may further contain small amounts of other metals. The porous catalyst is formed by first forming a precursor alloy of nickel and aluminum (optionally having small amounts of up to about 10 weight percent of other metals, such as Cr, Mo, Fe, Cu, Co, Zn and the like therein) in which the nickel is present in from about 35 to 60 weight percent, with the remainder being primarily aluminum; subjecting the formed alloy to an aqueous alkali (e.g., sodium hydroxide) solution to extract the aluminum metal from the alloy. When the resultant porous material is of the coarse granular, fixed bed type (cross sectional diameter of about 2 to 6 mm), the aluminum is only partially extracted to retain about 60 to 40, preferably 55 to 45 weight percent Ni and from about 40 to 60 weight percent Al. The fine granular fixed bed type (cross sectional diameter of about 0.1 to 2 mm) normally has about 60 to 95 weight percent Ni and from about 5 to 40 weight percent Al. As stated above, small amounts of the resultant porous catalyst may be composed of copper, iron, cobalt, zinc, chromium, molybdenum and the like or mixtures thereof, as well as chemically-bound oxygen in the resultant species.

The Raney Ni material can be formed according to the process described in U.S. Pat. Nos. 1,628,190; 1,915,473; 2,139,602; 2,461,396; and 2,977,327. The teachings of these patents are incorporated herein in their entirety by reference. Commercial products of this material are sold by W. R. Grace & Co. under the trademark RANEY®.

The catalyst material may be (a) granular; (b) a polymer bonded material that is not subjected to calcining; or (c) a calcined product. In cases where the catalyst is a formed material (b) or (c), the catalyst is formed from Raney Ni particles having a particle size in the range of minus 50 mesh (U.S. Standard screens) or less, such as minus 100 mesh or more preferably minus 200 mesh. The term "minus", when used in conjunction with mesh size, refers to material which passes through the designated mesh screen (U.S. Standard screens). The catalysts of Raney Ni may be formed by conventional methods, such as those described in U.S. Pat. Nos. 4,826,799 and 4,895,994, the teachings of which are incorporated herein in their entirety by reference. For example, the catalyst involved in contacting a fixed bed or moving bed of the packed bed catalyst with the sulfur-laden hydrocarbon liquid may be formed by:

First, mixing particles of minus 50 mesh or less of an alloy of nickel and aluminum with a high molecular weight polymer alone or further with a plasticizer for the polymer, such as mineral oil. In addition, small amounts (up to about 10 weight %) of other ingredients such as inert fillers, stabilizer, etc. can be added to the mix.

The mixture is formed into shaped material, typically by extrusion and cutting or by pellet molding.

The shaped material is then subjected to an extraction or other process step to remove all or at least a majority of the plasticizer from the shaped material.

The shaped material may be then treated in ways to form the active fixed bed catalyst. For example, the shaped material may be treated with alkali (e.g., sodium hydroxide) to remove aluminum metal by conventional Raney technique. Thus, the resultant material is a Raney Ni having a shape bound by a polymer.

Alternately, the shaped fixed bed catalyst material can be calcined and then subjected to alkali solution to remove a majority of the aluminum from the initial alloy. The resultant porous shaped Raney Ni will be substantially free of polymer and plasticizer.

The above fixed bed catalyst can, as stated above, be formed with the use of a polymer alone or additionally with a plasticizer for the polymer.

In the case where the material is subjected to calcining, the alkali leaching of aluminum from the calcined fixed bed catalyst precursor may provide a Raney Ni fixed bed catalyst, such as that illustrated by the table herein below. Oxygen may be present as bound to aluminum (as alumina) and, in addition, small amounts of oxygen may be chemically bound to certain other metals that are present. This explains the differences of the content of the compositions when done on a metal only basis versus that done on a total composition basis. The retention of high aluminum content as metal or alumina provides a fixed bed catalyst of high strength suitable for the cyclic processing as required by the present invention and described herein below.

Generalized compositions formed by various extrusion or pelleting processes are shown in Table below:

| Components | % based on metal Polymer bound | % based on metal Calcined | Total composition Polymer Bound | Total composition Calcined |
| --- | --- | --- | --- | --- |
| Al | 5–40 | 17–32 | 4–36 | 15–25 |
| Ni | 60–95 | 68–83 | 48–85 | 50–70 |
| Polymer | | | 10–20 | |
| Oxygen* | | | | 18–30 |

*The oxygen content is bound to aluminum and/or to other metals present.

Polymers suitable for forming fixed bed catalyst used in the present invention include materials which are fluid at some stage in their processing. Suitable thermoplastics for carrying out this invention include: unplasticized polyvinyl chloride, polyvinyl chloride-propylene copolymer, polyvinyl chloride-ethylene copolymers, polyvinylidene chloride copolymers, polystyrene, impact styrene, ABS resin, styrene butadiene block copolymers, polyethylene of low (0.91 sp. gr.) to high density (0.97 sp. gr.), polyethylene copolymers with propylene, butene, 1-pentane, 1-octane, hexene, styrene, etc., polyethylene copolymers with vinyl acetate, alkyl, acrylate, sodium acrylate, acrylic acid, etc., chlorinated polyethylene, chlorosulfonated polyethylene, polypropylene and propylene-olefin copolymers, polybutene and butylene-olefin copolymers, poly-4-methyl-1-pentene, thermoplastic polyurethane, polyamides, e.g., Nylon-5, Nylon-12, Nylon-6/6, Nylon-6/10, Nylon-11, fluorocarbon resins such as FEP, polyvinylidene fluoride, polychlorotrifluoroethylene; acrylonitrile-methyl acrylate copolymers, acrylonitrile-vinyl chloride copolymers, methacrylonitrile-styrene copolymers, polymethyl inethacrylate, cellulose acetate, cellulose acetate butyrate, acetal, polycarbonate, polysulfone, polyethylene oxide, polypropylene oxide, polyphenylene oxide, polyethylene and butylene terephthalates.

Many thermosetting resins and crosslinkable resins are also suitable for purposes of this invention and include the following: radiation cured polyethylene, peroxide-cured polyethylene, diazo crosslinked polypropylene, epoxy resins; hydrocarbon, chloroprene, and nitrile rubbers, furane, melamine-formaldehyde, urea-formaldehyde, phenol-formaldehye, diallyl phthalate, polyesters and silicones.

From economic considerations, one wishes to use relatively inexpensive binder polymer since in one of the processes of forming the fixed bed catalyst, it will be burned away in the final product. A preferred group of polymers are polyolefins, polyvinyl chlorides, polyvinyl acetates, polystyrenes and mixture of these polymers. The polyolefins are most preferred, and these are discussed separately below.

The preferred polyolefin component is the same as those used in mixes of the prior art, e.g., as described in U.S. Pat. Nos. 3,351,495 and 3,904,551. Thus, the polyolefin (which may be a mixture) has a high molecular weight (at least 100,000). Suitably it is a linear polyethylene of at least 0.93 to 0.97 g/cm$^3$ density, high molecular weight polypropylene, or high molecular weight particle form ethylene-butylene copolymer. Others are polybutene, ethylene-propylene copolymers, ethylene-butene copolymers, propylene-butene copolymers, and ethylene-propylene-butene copolymers. A useful polyolefin is a commercial particle form high molecular weight polyethylene having a standard load (2,160 g) melt index of 0.0; a high load (21,600 g) melt index of 1.8, a density of 9.96, and a solution viscosity of 4.0 measured as 0.02 g of polymer in 100 g decalin at 130° C.

Blends of high and low molecular weight polyolefins can be used, bearing in mind that as the average molecular weight is reduced, the possibility of slumping is increased during the bake-out and early part of the firing process.

The plasticizer component, when used, can be that used in prior art mixes, e.g., as described in U.S. Pat. Nos. 3,904,551 and 3,351,495, bearing in mind that some plasticizers will react violently with finely divided Al, e.g., the lower alcohols, and that these should, of course be avoided. A particularly useful plasticizer is mineral oil. Hydrocarbons, (e.g., paraffin oil and low molecular weight polymers such as polyisobutylene and polybutadiene) are suitable. The more volatile types of mineral oil are preferred if removal is to be done by baking.

The plasticizer enhances processing of the composition, i.e., it lowers the melt viscosity and reduces the amount of power input, which is required to compound and fabricate the composition. Very importantly, the plasticizer, by its removal, imparts porosity to the composition and increases its viscosity such that slumping during the initial part of the firing is eliminated, thereby providing greenware suitable for firing, in that it retains its shape and combustion products from the polyolefin or other polymer and residual amounts of plasticizer can escape through the pores.

When plasticizer is used, it comprises about 10–40 wt. %, preferably 15–30 wt. %, of the total mixture. This is equivalent to about 0.1–0.35 cc/g, or about 30–70 volume %, preferably about 35–55 volume %.

Removable, finely divided fillers can be added to enhance porosity or for other purposes. For example, Al powder may be added which is substantially removed during the leaching step with NaOH. Other powdered fillers that can be removed in the NaOH or other aqueous solution include sugar, various salts, such as sodium carbonate, powdered urea, and the like. Some fillers can be added with a view of increasing bulk and/or strength in the final catalyst shape; i.e., they remain in the shape as used. Such fillers include $TiO_2$, alpha-alumina, mullite, cordierite, etc. All are, of course, finely divided. The $TiO_2$ may be expected to react with alumina to form aluminum titanate during the sintering process.

It is conventional to add stabilizers (antioxidants) and lubricants when fabricating polyolefin-containing materials. Such additives and the amounts and manner of their use are well known in the art. Representatives of stabilizers are 4,4 thiobis (6-tert-butyl-m-cresol) ("Santonox") and 2,6-di-tert-butyl-4-methylphenol ("Ionol"). Stabilizers are burnt off during firing. Zinc stearate is a preferred lubricant, and may be used in up to a 0.5% concentration as an aid to give good dispersion of the solids in the polymer-plasticizer solution during compounding. Other commonly known extrusion aids, stabilizers, and coupling agents can advantageously be incorporated in said formulations.

In its simplest aspect, the formation of fixed bed catalyst involves mixing together only polymer and fine particles of nickel-aluminum alloy, omitting plasticizer, filler, etc. The mixture is shaped and at least a portion of the Al leached from the shape with NaOH solution to provide a shaped polymer-bound Raney fixed bed catalyst. In another embodiment using only polymer and alloy, following shaping, the shaped mixture is calcined to remove polymer and to sinter the alloy particles, then Al is leached out to form the final calcined catalyst.

(1) The Compounding Operation

Mixing of the initial components used to form the fixed bed catalyst utilized herein can be done by any conventional means. For example, they can be mixed using a Haake Rheometer, or a Banbury or Brabender mixer. When continuous compounding is desirable, the use of intermeshing twin screw compounders is desirable. An example is the MP compounder manufactured by Baker Perkins Co. and the ZSK compounder manufactured by Werner and Pfleiderer. Acceptable compounds may also be made by multiple passes through conventional single screw thermoplastic extruders.

In the specific case of where polyethylene/oil plasticizer is used, on cooling the mix, the oil separates as a finely dispersed liquid phase, readily removed as herein described.

The mixture thus comprises:
 (a) particles of Ni—Al alloy of a particle size of minus 50-mesh or finer, preferably about minus 100 mesh and more preferably minus 200 mesh: about 60–90 parts by weight, preferably about 70–85 parts;
 (b) high molecular weight polymer, about 1–30 parts by weight, preferably about 2–20 parts; and
 (c) plasticizer, 0–40 parts by weight, preferably about 10–30 parts by weight, equivalent to about 0–70 volume % of the total mixture, preferably about 35–55 volume %.

(2) Shaping the Mixture

The resulting mixture is then formed into shapes, having regard to the geometrical form desired in the finished fixed bed catalyst. Extrusion is one of the simplest methods of shaping. For example, the mixture can be extruded in conventional extruders as solid rods, tubes (hollow or vaned), and filaments, all chopped into segments of the desired length in the known way. Some of the simplest and most effective shapes are pellets made by cutting 1/32, 1/16, 1/8 or 1/4 inch diameter rods into one half to six times the rod diameter. Hollow cylinders and radial-vaned catalyst pellets may be made by various extrusion processes. See, e.g., U.S. Pat. No. 3,907,710 (Lundsager) and U.S. Pat. No. 4,510,263 (Pereira et al.) which discloses extrudes with a cylindrical, hollow annular configuration with internal reinforcing vanes. Other thermoplastics forming processes such as compression and injection molding may also be used. The general idea is that the mixture is shaped into final form prior to use (in the case of our polymer-bound catalyst) or prior to firing (in the case of our calcined catalyst). It is preferred to have the mixture heated during shaping since it is easier to shape the polymer containing mass when it is heated.

At this point the material of the shape is still identical in composition to the mixture of (1). It is ready for the next step:—removal of some or all of the plasticizer (e.g., mineral oil).

(3) Plasticizer (Oil) Removal

Plasticizer can be removed from the shape made in Step (2) by various methods. The two best are extraction with a solvent (e.g., hexane), or, if the plasticizer is sufficiently volatile (as are certain mineral oils), by heating the shape in an air circulating oven at about 100° C. for a few hours, whereby the oil is vaporized and removed; in essence the shape is dried. Removal of plasticizer leaves a shaped composition consisting essentially of particles of Raney process alloy in a polymer matrix. That is to say, at this point the composition consists essentially of an intimate mixture of:
 (a) particles of alloy, passing 50 mesh, preferably passing 100 mesh and more preferably passing 200 mesh U.S. Standard Sieve Size, about 60–99 parts by weight, preferably about 80–98 parts;
 (b) high molecular weight polymer, about 1–30 parts by weight, preferably about 2–20 parts; and
 (c) Homogeneous voids, left by removal of plasticizer, if any, of about 0.1–70 volume % of the mixture, preferably about 35–55 volume %.

As noted, in some formulations the plasticizer may be omitted, in which case there will of course be no plasticizer-generated voids. When a plasticizer is used, the voids occupy the same volume (or a little less) that the plasticizer occupied.

Here, as above noted, the invention branches. The next step can be either leaching Al with caustic soda solution as described in 4 below, or it can be calcination followed by leaching as described in 5 below.

(a) Leaching Al

We describe partial leaching out Al with strong caustic soda solution (typically about 6N). Leaching is done hot, for example at about 90° C., but preferably not over 100° C. Leaching with NaOH is exothermic, and cold water may be added periodically to maintain the temperature at 90° C. Leaching may require several hours, and is preferably concluded with a fresh sodium hydroxide solution for an additional hour. The leached shape is then washed with water continuously until the pH of the water drops to less than about 9. The result is a shape consisting of a polymer-bound aggregation of Raney Ni fixed bed catalyst particles made by the Raney process. These particles are still connected by the original polymer matrix. At this point the shaped catalyst differs from the composition of (3) in that most or nearly all of the Al has been removed, leaving the Raney process metal. Thus the catalyst consists essentially of an intimate mixture of:
 (a) particles of Raney Ni metal with residual Al, about 15–50 parts by weight, preferably about 20–47 parts by weight;
 (b) high molecular weight polymer, about 1–30 parts by weight, preferably about 2–20 parts by weight; and
 (c) homogeneous voids within the mixture, about 0.1–90 volume % of the total mixture, preferably about 40–80 volume %.

The composition has a surface area of about 20–80 m$^2$/g and a macroporosity of about 0.1–70% of the total porosity.

Several methods of leaching are described by Freel et al. Journ. of Catalysis, vol. 14, No. 3, p. 247 (1969). We prefer leaching with NaOH solution.

5. We proceed now to the second alternate where the composition of (3) is calcined followed by sodium hydroxide leaching.

Calcination

The shapes of (3) are heated so as to remove polymer, followed by calcining to fuse the alloy particles to a porous metal structure. Simultaneously some of the Al metal is converted to alpha-alumina. Thus, the composition is calcined first in a furnace at about 200°–700° C., preferably in the presence of air or oxygen. The temperature is increased and calcination is completed at temperature between 850° and 1,200° C. Calcination at 900° C. for about 1 to 2 hours is optimum. It is pointless to continue heating beyond 1,200° C.

The composition may gain weight during calcining because of the conversion of some Al metal to alpha-alumina. The weight gain may be typically 5–20% and is a consequence of an essential step in the formation of calcined fixed bed catalyst. The alpha-alumina "spot-welds" or cements (sinters) the particles of nickel—aluminum alloy together.

The resultant shaped fixed bed catalyst precursor that has been calcined in the manner described above is then subjected to alkali to remove the aluminum and provide an activated fixed bed catalyst. The leaching can be accomplished in manners such as that described in 4 above.

The resultant Raney Ni—Al fixed bed catalyst consists essentially of particles of Raney Ni and aluminum cemented together with alumina. The resultant material is highly porous having a gross composition of from about 20–50 weight percent $Al_2O_3$ and Raney Ni forming substantially the balance. The BET surface area is normally within the range of 20 to 80 m²/g and has a pellet density (weight divided by total pellet volume) of from about 0.5 to 2, such as 1.1 to 1.8 g/cc and a packed bed density of from about 0.4 to 0.7 g/cc.

The calcined extruded or pelleted fixed bed catalyst has a structure that contains macropores as well as micropores. The macropores extend throughout the fixed bed catalyst and provide porosity of at least 600 Angstroms. This porosity is attributable to the removal of plasticizer or the combined polymer/plasticizer component from the fixed bed catalyst. The microporosity is predominantly associated with the voids caused by the removal of aluminum from the precursor nickel-aluminum allow particulate used to form the fixed bed catalyst. The total void volume is normally about 30 to 70 volume percent of the fixed bed catalyst pellets. The total pore volume of the Raney Ni—Al particles is normally about 0.3 to 0.5 cc/g.

It has been found that sulfur species can be removed from sulfur-laden hydrocarbon liquids by contacting the liquid with a Raney Ni fixed bed catalyst. The desulfurization of liquid fractions of a fluid catalytic cracking catalyst process is particularly suitable to the present process. The product streams of FCC processes are known to contain undesirable amounts of sulfur species, which, unless removed, may render the product unsuitable for use as a fuel in view of present environmental concerns. Thus, the present invention provides a means to economically, effectively and efficiently remove sulfur species from the hydrocarbon liquids without causing a detrimental impact on the remaining components of the treated liquid.

The Raney Ni fixed bed catalyst may be contained in a vessel, which is in line with the product stream of the sulfur-laden liquid of the petroleum refining process, such as a FCC unit. The fixed bed catalyst may be contained in a conventional fixed bed or moving bed reactor vessel into which the sulfur-laden hydrocarbon liquid is introduced. For example, the fixed bed reactor may have the form of a vertical cylinder in which the interior is divided by horizontal partitions. These partitions are perforated or foraminous plates or the like which aid in supporting and retaining the Raney Ni fixed bed catalyst while allowing the liquid being treated to pass through. Because the vessel is packed with the fixed bed catalyst, the liquid is required to incur a tortuous path through the fixed bed catalyst and be in intimate contact with the Raney Ni fixed bed catalyst. The sulfur-laden liquid is normally allowed to pass down through the fixed bed catalyst bed. Several fixed bed reactors are normally utilized in parallel to allow for continuous desulfurization while permitting regeneration of spent fixed bed catalyst, as described herein below. The resultant liquid product has been found to have very low levels of sulfur species remaining and, thereby, provide an environmentally desirable product.

Similarly, the Raney Ni catalyst may be contacted with the sulfur-laden hydrocarbon liquid used in a moving-bed reaction vessel. In this instance, the fixed bed catalyst and the sulfur-laden liquid are introduced into the moving bed vessel. This may be done in a concurrent or countercurrent (preferred) manner with the spent fixed bed catalyst and desulfurized liquid being captured.

The sulfur-laden hydrocarbon liquid and Raney Ni—Al fixed bed catalyst are contacted at low temperatures and pressures. The materials are contacted at temperatures ranging from about 15° C. to 150° C., preferably from 20 to 125° C. The pressure under which contact is accomplished is about one atmosphere although elevated pressure of from ambient to about 0.5 to 1 mPa (5–10 atmospheres)(with the use of inert gas, such as $N_2$) may be used.

It has been found that the present process provides desulfurization of the liquid hydrocarbon feed without reducing the octane rating of the liquid. Thus, the olefinic components are not reduced to saturated compounds to cause a reduction in the octane rating of the liquid.

The Raney Ni fixed bed catalyst will be effective for a period of time, after which the rate of adsorption of sulfur species will decrease. The exact point when this change of rate occurs will depend on the liquid hydrocarbon being treated, the amount and type of sulfur species being adsorbed, and the type of contact being used. The rate can be readily monitored to determine when the fixed bed catalyst should be subjected to regeneration, as required by the present process.

The regeneration of the subject Raney Ni fixed bed catalyst can be achieved by:

i) treating the spent fixed bed catalyst with an aqueous solution of a mild chemical oxidant such as, for example hydrogen peroxide, an alkali metal hypochlorite (e.g. NaOCl), an alkali metal nitrate (e.g., $NaNO_3$) or an alkali metal nitrite (e.g., $NaNO_2$), an alkali metal perborate (e.g., $NaBO_3$), peroxy acids (e.g., peroxy acetic acid) and the like. This is accomplished at ambient pressure and at temperatures extending from ambient to the boiling point of the aqueous solution, preferably from ambient to about 10° C. below the boiling point. This may be followed by washing with water or a mild alkaline solution to remove unreacted oxidant and/or any remaining oxidized sulfur species;

ii) Treating the spent fixed bed catalyst with hydrogen gas at elevated temperatures of from 100° C. to 500° C., preferably from 200 to 400° C.;

iii) Treating the spent catalyst with a mild chemical oxidant, as described herein above, followed by subjecting the material to hydrogen at elevated temperatures, as also described herein above. This method of treating the spent catalyst is most preferred as using mild oxidants alone may leave a portion of the catalyst in an oxidized state and thereby in a less active form and mere treatment with hydrogen may produce bulk sulfides which are difficult to fully remove. Combining the treatments in the stated sequence has been found to alleviate both of the concerns to produce an active catalyst substantially free of sulfur compounds; or iv) Treating the spent fixed bed catalyst by contacting it with a metal salt of an organic acid provided a) the organic acid does not have high reactivity with the Raney Ni and b) the metal ion forms a sulfide ($MS_x$ where x is 1–5) which is insoluble in acidic and soluble in alkaline solution and c) the organic acid salt is at least partially soluble in water.

Organic acids which can be used to regenerate the Raney Nickel fixed bed catalyst include: saturated monocarboxylic aliphatic acids, e.g., formic acid, acetic acid, propionic acid, isovaleric acid, etc.; saturated dicarboxylic aliphatic acids, e.g., oxalic acid, maloric acid, succinic acid, glutaric acid, adipic acid, pimelic acid, etc.; saturated tricarboxylic aliphatic acids, e.g; hydroxy-substituted aliphatic acids, e.g., glycolic acid, lactic acid, gamma-hydroxybutyric acid, gluconic acid, malic acid, tartaric acid, saccharic acid, citric acid, etc.; and alicyclic acids, e.g., cyclopentane-carboxylic acid, hexahydrobenzoic acid, hexahydrophthialic acid, etc.

After the spent Raney Ni fixed bed catalyst and organic acid salt are admixed, the mixture is heated to at least about 40° C. and held at that temperature for about 5 minutes residence time. The pH of the suspension is then increased to about 6.5 to 7.1 by the addition of base. The base is preferably in an aqueous solution. The temperature can be retained at the elevated level during this addition. At this point the insoluble metal sulfide produced in the organic acid treating step to a soluble condition so that it can be removed from the catalyst-base solution admixture by decantation, filtration or some other known technique of separating a solid from a liquid. Following such a liquid removal step, the rejuvenated Raney nickel catalyst is washed, preferably with a dried alcohol, to remove traces of the treating solutions.

The preferred modes of regeneration are those of ii) and iii) described above and the most preferred mode is that of iii) above.

The regenerated Raney Ni fixed bed catalyst can then be used to remove sulfur species from additional sulfur-laden hydrocarbon liquid. For example, when the fixed bed catalyst is used to pack a series of fixed bed reactors which run in parallel, the liquid can be treated sequentially through a single or multiple reactor(s) while the remaining reactor(s) of the series are subject to regeneration of its fixed bed catalyst in the manner described above. By alternating the reactors of the series, one can have a continuous process of forming substantially free hydrocarbon product conducted in an efficient and economical manner.

When an ebullating or moving bed reactor is used, the spent catalyst can be regenerated external to the reactor space in one of the manners described above and the regenerated catalyst can then be fed into the reactor.

It has been unexpectedly found that sulfur-laden hydrocarbon liquid, such as produced by conventional FCC processing of petroleum feed, can be readily desulfurized under low temperature and pressure condition. The presently required fixed bed Raney Ni catalyst, as described above, effectively removes the sulfur species from the hydrocarbon liquid under these mild conditions. Finally, the fixed bed catalyst, once spent of its ability to adsorb sulfur species, can be readily regenerated and reused to further remove sulfur species from additional sulfur laden hydrocarbon liquid. Thus, the present invention is directed to an effective and efficient process of desulfurization of liquids.

The following examples are given for illustrative purposes only and are not meant to be a limitation on the invention, as defined in the claims appended hereto. All parts and percentages are by weight unless otherwise indicated.

Further, any range of numbers recited in the specification or claims, such as that representing a particular set of properties, units of measure, conditions physical states or percentages, is intended to literally incorporate expressly herein by reference or other wise, any number falling within such range, including any subset of numbers within any range so recited.

EXAMPLE 1

A series of promoted granular fixed bed catalyts were formed in the manner described below:

A. A sample of Raney® Nickel alloy was prepared by first crushing an alloy having 58 weight percent Al and 42 weight percent Ni. The crushed material was passed through sieves of U.S. Standard Sieves No.8 and 12 to yield material of "8×12 mesh" particle size material. This material was converted into useful catalyst by recirculating a leaching solution through a bed of the particles. The leaching solution comprised 5000 g of a 4 weight percent sodium hydroxide and was used to treat 227 g of the 8×12 alloy granules. The flow rate was 3.9 liters/minute. The leaching was conducted for a period of 30 minutes while being maintained at a temperature of 38° C. The catalyst was than treated with 3630 g of a 3 weight percent NaOH solution and then with about 20 L of water, all at 38° C., until the effluent has a pH of less than 9.5.

Additional samples of catalyst were formed in the same manner as described above except for the following differences:

B. The initial alloy contained 4 weight percent Mo with the Ni and Al being present in the same ratio as described with respect to the alloy of Example 1;

C. Activation was conducted with a 5 weight percent NaOH aqueous solution that further contained 0.5 weight percent ZnO dissolved therein. The resultant catalyst contained 2.8 weight percent Zn;

D. Subsequent to activation with NaOH solution, the material was contacted with a solution $K_2ReCl_6$ to provide a product having 0.2 weight percent Re; and E. Subsequent to activation with NaOH solution, the material was contacted with a solution $K_3RuCl_6$ to provide a product having 0.3 weight percent Ru.

EXAMPLE 2

A series of samples of promoted extruded fixed bed catalytic material were formed in the manner described below:

A. A mixture of powdered 58 weight percent Al/48 weight percent Ni alloy, a polyethylene oxide polymer and glycerine, as a lubricant, were compounded in the same manner as described in U.S. Pat. Nos. 4,826,799 and 4,895,994, which teachings are incorporated herein by reference. The mixture was extruded through a ⅛ inch circular cross sectional die head using a Haake Rheometer. The polymer and lubricants were removed with heat under an inert atmosphere and then the fixed bed catalyst precursor was calcined at 900° C. for 1 hour. The resultant calcined fixed bed catalyst precursor was then leached using NaOH by contacting the fixed bed catalyst with a 728 g recirculating aqueous solution having 20 percent NaOH for 60 minutes at 90° C. This was followed by a 3640 g recirculating aqueous solution containing 25 weight percent of NaOH for an additional 60 minutes at 90° C. Finally, the material was washed with water to achieve a pH of less than 9.5.

Additional samples were formed in the same manner as described above except for the following differences:

B. After treatment with NaOH, the fixed bed catalyst was contacted with a solution containing Ammonium Heptamolybdate to cause 2.8 weight percent Mo to be deposited in the resultant fixed bed catalyst product.

C. The initial alloy contained 2.0 weight percent Fe metal

D. The initial composition was extruded at 1/16 inch diameter and after activation by contact with NaOH, the material was contacted with an aqueous solution containing Tetraaminine $PdCl_2$ in an amount to deposit 0.4 weight percent Pd in the final product.

E. The initial composition was extruded at 1/16 inch diameter and then contacted with a solution of $K_2ReCl_6$. The resultant material was analyzed and had 0.1 weight percent Re in the final product.

F. After activation by contact with NaOH, the material was contacted with an aqueous solution containing Tetraammine Platinum chloride The resultant material contained 0.03 weight percent Pt in the final product.

EXAMPLE 3

The catalysts of Examples 1 and 2 were analyzed according to the following methods:

B.E.T. Surface Area: According to procedure described in "Surfaces of Raney® Catalysts" by S. R. Schmidt in Catalysis of Organic Reactions, edited by Scaros and Prunier, published by M. Dekker (1995).

CO Chemisorption: Pulse method conducted at 0° C. as described in "Surfaces of Raney® Catalysts" ibid. calculated using the formula: Surface Area(Ni)=[Vol. CO/g catalyst]/0.587.

Weight Percent Ni: ICP-AES method after dissolution of sample of catalyst in acid.

The B.E.T. and chemisorbing surface areas were normalized to packed bed volume, by multiplying the weight-normalized surface areas by the apparent bulk density (ABD) appropriate for the type of catalyst (1.8 g/cc for granular type and 0.6 g/cc for extruded type). ABD was calculated by determining the settled volume of a water-covered sample of catalyst and then vacuum drying the entire sample before weighing under an inert gas atmosphere. The weight/volume ratio equals ABD. This ratio varies negligibly over different composition used.

The properties of the Samples 1 A–E and 2 A–F are listed in Table 1 below:

The gasoline was passed through the column at a constant flow rate in an upward ("flooded-bed") manner. The used catalyst bed was periodically purged of gasoline and then regenerated by first purging it of residual gasoline with flowing $N_2$ at a rate of about 1 liter/minute with the catalyst bed temperature held at 130° C. for 30 minutes and then the catalyst was dried and reduced at 200° C. for 2 hours in flowing $H_2$ at the rate of about 0.5 liter/minute. After cooling to ambient temperature in the flowing $H_2$, the adsorption and regeneration steps were repeated. Samples of treated gasoline were periodically collected at a point beyond the exit end of the catalyst tube (for later off-line sulfur analysis) up to a prescribed elapsed time and the resulting capacity of the catalyst was determined.

Samples of the treated gasoline were analyzed for sulfur content by GC-AED method using an Agilent Technologies AED detector Model G2350A and an Agilent Technologies GC Model 6890 GC. Quantification of sulfur in the gasoline was conducted in accordance to ASTM D 5623. The value of adsorbed sulfur for each discrete time-dependent sample was calculated by subtracting the analyzed sulfur concentration from the analyzed baseline sulfur content of the untreated gasoline. These discrete adsorbed sulfur values were then integrated over the weight of gasoline delivered (weight=delivered volume X sp. gravity) to yield the cumulative amount of sulfur adsorbed from gasoline during a given experiment.

This result of the cumulative amount of adsorbed sulfur was normalized by dividing the determined result by the

TABLE 1

Example 3: Characterization of Catalysts

| | Catalyst Example No. | | | | | | | | | | |
|---|---|---|---|---|---|---|---|---|---|---|---|
| | 1A | 1B | 1C | 1D | 1E | 2A | 2B | 2C | 2D | 2E | 2F |
| Catalyst Type (Granular of Extrudate) | G | G | G | G | G | E | E | E | E | E | E |
| Dopant | none | Mo | Zn | Re | Ru | none | Mo | Fe | Pd | Re | Pt |
| Wt % Ni: | 51.5 | 64.3 | 53.6 | 52.5 | 51.9 | 65.8 | 71.8 | 76.3 | 70.9 | 64.3 | 72.6 |
| B.E.T. Surface Area $M^2/g$: | 18 | 63 | 35 | 23 | 9 | 86 | 94 | 54 | 51 | 41 | 59 |
| B.E.T. Surface Area/vol., $M^2/cc$: | 33 | 117 | 64 | 42 | 16 | 51 | 57 | 33 | 30 | 25 | 30 |
| CO Chemis orption (@ 0° C.), cc/g: | 5 | 10 | 10 | 5 | 9 | 17 | 15 | 14 | 11 | 12 | 31 |
| CO Chemis orbing S A (@ 0° C.)/vol, $M^2/cc$: | 9 | 19 | 19 | 10 | 17 | 10 | 9 | 8 | 7 | 7 | 19 |

EXAMPLES 4

The following general method was used to determine sulfur adsorption:

Each sample of catalyst was packed, under water, into a vertically-oriented stainless steel tube of 0.43" (1.1 cm) inner diameter. The packed tube was equipped with a piping system that permitted either gas or liquid to be pumped through the catalyst bed at controlled rates. A clamshell-type resistively heated furnace was placed around the catalyst-containing section of the tube to heat the bed during initial drying, sulfur-species adsorption, and regeneration steps.

The basic outline of the adsorption/regeneration experiments were conducted by first drying the catalyst sample being tested under a circulating atmosphere of $N_2$ alone or with $H_2$ at elevated temperature of 130° C. The catalyst sample was then allowed to achieve absorption temperature as indicated in each of the specific examples below while continuing the flow of gas.

The packed column of catalyst was then contacted with sulfur-containing gasoline at atmospheric pressure. The gasoline employed was a light cut naphtha with a specific gravity of 0.73 g/cc, a total analyzed sulfur content in the gasoline range of ~500 ppm by weight, and a boiling point range of 81–437° F. (27–225° C.).

weight of the catalyst bed employed, yielding the adsorptive capacity of the catalyst in g sulfur/kg of catalyst. For equivalent comparisons the cumulative gasoline volume used in the integration step was arbitrarily set at 70 ml, by which point the sulfur content of the effluent gasoline had approached the untreated baseline asymptotically (i.e. nearly all of the capacity was exhausted).

EXAMPLE 4-A

The granular Ni catalyst of Example 1A was charged to the reactor and contacted with gasoline, as generally described above, using the following the specific parameters:

Adsorption temperature ~25° C. (ambient temperature)

Gasoline flow rate of 0.5 ml/minute (Weight hourly space velocity (WHSV)=60 min.×(0.5 ml/min)×(0.73 g/mL)/21.6 g catalyst=1.0)

The measured sulfur capacity of the catalyst, calculated as described above, was 0.47 g sulfur/kg catalyst. (See Tables 2 and 3 for this and all subsequent results).

EXAMPLE 5

The procedures of Example 4–4A were followed except that the catalyst used was granular Mo/Ni catalyst of Example 1B.

EXAMPLE 6

The procedures of Example 4–4A were followed except that the catalyst used was extruded Mo/Ni catalyst of Example 2B.

EXAMPLE 7

The procedures of Example 4–4A were repeated using granular Ni catalyst of Example 1A with the exception of using 350° C. as the $H_2$ reduction temperature.

EXAMPLE 8

The procedures of Example 7 were repeated using granular Mo/Ni catalyst of Example 1B.

EXAMPLE 9

The procedures of Example 7 were repeated using extruded Ni catalyst of Example 2A.

EXAMPLE 10

The procedures of Example 7 were repeated using extruded Mo/Ni catalyst of Example 2B.

EXAMPLE 11

The procedures of Example 7 were repeated on extruded Pd/Ni Catalyst of Example 2D.

EXAMPLE 12

The procedures of Example 7 were repeated on granular Re/Ni catalyst of Example 2E.

EXAMPLE 13

The adsorption steps of Example 4–4A were repeated on granular Zn/Ni catalyst Example 1C. No regeneration or subsequent re-test was performed.

EXAMPLE 14

The adsorption steps of Example 4–4A were repeated on granular Re/Ni catalyst of Example 1D. No regeneration or subsequent re-test was performed.

EXAMPLE 15

The adsorption steps of Example 4–4A were repeated on granular Ru/Ni catalyst of Example 1E. No regeneration or subsequent re-test was performed.

EXAMPLE 16

The adsorption steps of Example 4–4A were repeated on extruded Fe/Ni catalyst of Example 2C. No regeneration or subsequent re-test was performed.

EXAMPLE 17

The adsorption steps of Example 4–4A were repeated on granular Ni catalyst Example 1A except that before contact with gasoline, the previously unused catalyst was pre-treated in flowing $H_2$ at 200° C. for 2 hrs and then cooled to ambient temperature. No regeneration or subsequent re-test was performed.

EXAMPLE 18

The procedures of Example 17 were repeated on granular Mo/Ni catalyst of Example 1B.

EXAMPLE 19

The procedures of Example 17 were repeated on extruded Mo/Ni catalyst Example 2B.

EXAMPLE 20

The procedures of Example 17 were repeated on extruded Pd/Ni Catalyst of Example 2D.

EXAMPLE 21

The procedures of Example 17 were repeated on extruded Pt/Ni catalyst of Example 2F.

The above Examples 4 to 21 show that the preferred catalysts based on initial capacity are those of extruded Example 2E and that recovery of a large fraction of the initial capacity can be achieved on regeneration using $H_2$ reduction alone at temperatures of about 200° C.–350° C.

EXAMPLE 22

The procedures of Example 8 above were repeated using granular Mo/Ni catalyst of Example 1B except that an oxidation step was conducted before the $H_2$, reduction step. Specifically, 60 ml of a 1.5% NAOCl solution was pumped through the catalyst bed at 70° C., followed by 60 ml of water while maintaining the temperature at 70° C.

EXAMPLE 23

The procedures of Example 22 were repeated except that the catalyst was that of extruded Mo/Ni catalyst of Example 2B. The results of Examples 4–23 are given in Table 2 below.

TABLE 2

Parameter Comparison for Sulfur Adsorption Effects on Fixed Bed Raney ®-Ni Catalysts

| | | 25° C. adsorption | | | | |
|---|---|---|---|---|---|---|
| Cat Example No. (1A–1E: granular type) | Catalyst | Test Example No. | fresh capacity | regeneration T(° C.) | generated capac | regen/fresh ratio |
| 1A | Ni G | 4 | 0.47 | 200 | 0.46 | 98% |
| — | — | 7 | 0.47 | 350 | 0.39 | 81% |
| 1B | Mo/Ni G | 5 | 0.30 | 200 | 0.44 | 147% |
| | | 8 | 0.31 | 350 | 0.40 | 129% |
| 1C | Zn/Ni G | 13 | 0.17 | NA | NA | NA |
| 1D | Re/Ni G | 14 | 0.30 | NA | NA | NA |
| 1E | Ru/Ni G | 15 | 0.37 | NA | NA | NA |

TABLE 2-continued

Parameter Comparison for Sulfur Adsorption Effects on Fixed Bed Raney ®-Ni Catalysts

| | | | 25° C. adsorption | | | |
|---|---|---|---|---|---|---|
| Cat Example No. (1A–1E: granular type) | Catalyst | Test Example No. | fresh capacity | regeneration T(° C.) | generated capac | regen/fresh ratio |
| (2A–2F: extruded type) | | | | | | |
| 2A | Ni E | 9 | 0.80 | 350 | 1.15 | 144% |
| 2B | Mo/Ni E | 6 | 0.75 | 200 | 0.80 | 107% |
| — | — | 10 | 1.39 | 350 | 1.01 | 73% |
| 2C | Fe/Ni E | 16 | 0.32 | NA | NA | NA |
| 2D | Pd/Ni E | 11 | 1.05 | 350 | 0.40 | 38% |
| 2E | Re/Ni E | 12 | 1.25 | 350 | 0.61 | 49% |
| | oxidation + hl-T H2 red'n to regenerate | | | | | |
| 1B | Mo/Ni G | 22 | 0.32 | 350 | 0.34 | 106% |
| 2B | Mo/Ni E | 23 | 1.15 | 350 | 0.74 | 64% |
| | 200° C. pre-reduction | | Effect of red'n on fresh capacity with pre-red'n ratio, with/without | | | |
| 1A | Ni G | 17 | 0.50 | 106% | | |
| 1B | Mo/Ni G | 18 | 0.49 | 161% | | |
| 2B | Mo/Ni E | 19 | 1.44 | 104% | | |
| 2D | Pd/Ni E | 20 | 0.85 | 81% | | |
| 2F | Pt/Ni E | 21 | 1.27 | NA | | |

EXAMPLE 24

The procedures of Example 4–4A were repeated except that the catalyst was that of granular Ni catalyst of Example 1A and that the sulfur adsorption step was performed at 125° C.

EXAMPLE 25

The procedures of Example 24 were applied to granular Ni catalyst of Example 1A except that the $H_2$ regeneration steps was conducted at 350° C.

EXAMPLE 26

The procedures of Example 25 were applied to granular Mo/Ni catalyst of Example 1B except that the catalyst was subjected through 3 adsorption cycles and 2 cycles of regeneration.

EXAMPLE 27

Granular Mo/Ni catalyst of Example 1B was pre-treated in $H_2$ at 200° C. in the same manner as described in Example 18. The catalyst was subjected to absorption, oxidation and regeneration for three absorption passes. The regeneration step was conducted at 200° C. using $H_2$.

The results of Examples 24–27 are presented in Table 3 below. These results show that a higher fresh capacity can be achieved with Mo/Ni catalysts when using high temperature $H_2$ pre-treatment and higher adsorption temperatures (e.g. 125° C.).

TABLE 3

| | | | 125° C. adsorption | | | |
|---|---|---|---|---|---|---|
| Cat Example No. | Catalyst | Test Example No. | fresh capacity | regeneration T (° C.) | regeneration capacity | regen/ fresh ratio |
| 1A | Ni G | 24 | 0.31 | 200 | 0.26 | 85% |
| | | 25 | 0.53 | 350 | 0.25 | 46% |

TABLE 3-continued

| | | | 125° C. adsorption | | | |
|---|---|---|---|---|---|---|
| Cat Example No. | Catalyst | Test Example No. | fresh capacity | regeneration T (° C.) | regeneration capacity | regen/ fresh ratio |
| 1B | Mo/Ni G | 26 | 0.83 | 350 | 0.42 (1st rgen.) | 51% |
| | | | 0.83 | 350 | 0.65 (2nd regen) | 78% |
| pre reduce fresh catalyst in H2/200° C. then oxide/redo to regenerate | | | | | | |
| 1B | Mo/Ni G | 27 | 0.68 | 200 | 0.56 (1st regen) | 82% |
| | | | 0.68 | 200 | 0.54 (2nd regen) | 79% |

It is claimed:

1. A process for desulfurization of a hydrocarbon liquid comprising
    a) contacting sulfur-laden hydrocarbon liquid with a packed bed catalyst composition composed of sponge nickel metal alloy to produce a hydrocarbon liquid having a reduced sulfur content;
    b) separating from the packed bed catalyst composition and recovering the hydrocarbon liquid having a reduced sulfur content;
    c) regenerating the packed bed catalyst composition by treating it with an aqueous solution of at least one oxidant selected from the group consisting of hydrogen peroxide, an alkali metal hypochorite, an alkali metal nitrate, an organic peroxy acid or mixtures thereof, to remove sulfur contained therein;
    d) contacting the regenerated packed bed catalyst composition of step c), alone or with additional packed bed catalyst composition, with additional sulfur-laden hydrocarbon liquid to remove sulfur therefrom; and
    e) cyclically repeating steps b), c) and d).

2. The process of claim 1 wherein the sulfur-laden hydrocarbon liquid is contacted with packed bed catalyst composition at temperatures of from about 20° C. to 150° C. and at about one atmosphere pressure.

3. The process of claim 1 wherein the sulfur-laden hydrocarbon liquid is contacted with packed bed catalyst composition at temperatures of from about 20° C. to 150° C. and at a pressure of from ambient to about 1 MPa.

4. The process of claim 1, 2 or 3 wherein step c) is conducted at a temperature of from about 50° C. to the boiling point of the aqueous oxidant solution.

5. The process of claim 4 wherein the oxidant is sodium hypochlorite, sodium nitrite or sodium nitrate.

6. The process of claim 4 wherein the oxidant is peroxyacetic acid.

7. The process of claim 1 wherein the step c) further includes washing the catalyst with water or with an alkaline solution.

8. The process of claim 1, 2, 3 or 7 wherein the steps a), b) and d) are each conducted in a first reaction zone and step c) is conducted in a second reaction zone.

9. A process for desulfurization of a hydrocarbon liquid comprising
   a) contacting sulfur-laden hydrocarbon liquid with a packed bed catalyst composition composed of sponge nickel metal alloy to produce a hydrocarbon liquid having a reduced sulfur content;
   b) separating from the packed bed catalyst composition and recovering the hydrocarbon liquid having a reduced sulfur content;
   c) regenerating the packed bed catalyst composition by treating it with hydrogen gas at elevated temperature of from about 100° to 500° C., to remove sulfur contained therein;
   d) contacting the regenerated packed bed catalyst composition of step c), alone or with additional packed bed catalyst composition, with additional sulfur-laden hydrocarbon liquid to remove sulfur therefrom; and
   e) cyclically repeating steps b), c) and d).

10. The process of claim 9 wherein the sulfur-laden hydrocarbon liquid is contacted with packed bed catalyst composition at temperatures of from about 20° C. to 150° C. and at about one atmosphere pressure.

11. The process of claim 9 wherein the sulfur-laden hydrocarbon liquid is contacted with packed bed catalyst composition at temperatures of from about 20° C. to 70° C. and at a pressure of from ambient to about 1 mPa.

12. The process of claim 9, 10 or 11 wherein step c) is carried out at from about 100° C. to about 500° C.

13. The process of claim 9, 10 or 11 wherein step c) is carried out at from about 200° C. to about 400° C.

14. The process of claim 9, 10 or 11 wherein step c) further comprises first washing the spent catalyst with a liquid selected from an aldehyde, ketone or an alkanol.

15. The process of claim 14 wherein the liquid is selected from acetone or a $C_1$–$C_3$ alkanol.

16. The process of claim 9, 10, or 11 wherein the steps a), b) and d) are each conducted in a first reaction zone and step c) is conducted in a second reaction zone.

17. A process for desulfurization of a hydrocarbon liquid comprising
   a) contacting, in a first reaction zone, sulfur-laden hydrocarbon liquid with a packed bed catalyst composition composed of sponge nickel metal alloy to produce a hydrocarbon liquid having a reduced sulfur content;
   b) separating from the packed bed catalyst composition and recovering the hydrocarbon liquid having a reduced sulfur content;
   c) regenerating the packed bed catalyst composition by contacting it in a second reaction zone with an aqueous solution of at least one oxidant selected from hydrogen peroxide, an alkali metal hypochorite, an alkali metal nitrate, an organic peroxy acid or mixtures thereof, to remove sulfur contained therein;
   d) treating the packed bed catalyst composition of step c) with hydrogen gas at an elevated temperature of from about 100 to 500° C.;
   e) returning the catalyst composition of step d) to the first reaction zone and therein contacting the regenerated packed bed catalyst composition, alone or with additional packed bed catalyst composition, with additional sulfur-laden hydrocarbon liquid to remove sulfur therefrom; and
   f) cyclically repeating steps b), c), and d).

18. The process of claim 17 wherein the sulfur-laden hydrocarbon liquid is contacted with packed bed catalyst composition at temperatures of from about 20° C. to 150° C. and at about one atmosphere pressure.

19. The process of claim 17 wherein the sulfur-laden hydrocarbon liquid is contacted with packed bed catalyst composition at temperatures of from about 20° C. to 150° C. and at a pressure of from ambient to about 1 MPa.

20. The process of claim, 17, 18 or 19 wherein step c) is carried out at a temperature of from about 50° C. to the boiling point of the aqueous oxidant solution.

21. The process of claim 20 wherein step d) is carried out at from about 100° C. to 500° C.

22. The process of claim 17, 18 or 19 wherein the steps a), b) and d) are each conducted in a first reaction zone and step c) is conducted in a second reaction zone.

23. The process of claim 1, 2, 3 or 7 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

24. The process of claim 4 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

25. The process of claim 5 the sulfur-laden hydrocarbon liquid is a petroleum feedstream containing elemental sulfur, sulfur-containing compounds or mixtures thereof in an amount sufficient to provide sulfur analysis of at least about 0.05 weight percent.

26. The process of claim 6 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

27. The process of claims 9, 10 or 11 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

28. The process of claim 14 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

29. The process of claim 17, 18 or 19 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

30. The process of claim 20 wherein the sulfur-laden hydrocarbon liquid is a petroleum feedstream containing elemental sulfur, sulfur-containing compounds or mixtures thereof in an amount sufficient to provide sulfur analysis of at least about 0.05 weight percent.

* * * * *